United States Patent [19]

Means et al.

[11] Patent Number: 5,138,695
[45] Date of Patent: Aug. 11, 1992

[54] SYSTOLIC ARRAY IMAGE PROCESSING SYSTEM

[75] Inventors: Robert W. Means, Rancho Santa Fe; Horace J. Sklar, Escondido, both of Calif.

[73] Assignee: HNC, Inc., San Diego, Calif.

[21] Appl. No.: 419,040

[22] Filed: Oct. 10, 1989

[51] Int. Cl.$^5$ .................................................. G06K 9/64
[52] U.S. Cl. ....................................... 395/27; 395/22; 382/42
[58] Field of Search ................ 364/728.01, 728.03, 364/728.06, 200; 395/27; 382/42

[56] References Cited

U.S. PATENT DOCUMENTS

| | | | |
|---|---|---|---|
| 4,546,445 | 10/1985 | Haugen | 364/728 |
| 4,559,606 | 12/1985 | Jezo et al. | 364/728 |
| 4,737,921 | 4/1988 | Goldwasser et al. | 364/518 |
| 4,752,897 | 6/1988 | Zoeller et al. | 364/550 |
| 4,758,999 | 7/1988 | Marwood et al. | 367/121 |
| 4,760,604 | 7/1988 | Cooper et al. | 382/15 |
| 4,769,779 | 9/1988 | Chang et al. | 364/754 |
| 4,807,183 | 2/1989 | Kung et al. | 364/900 |
| 4,833,635 | 5/1989 | McCanny et al. | 364/728.01 |
| 4,868,828 | 9/1989 | Shao et al. | 371/5.1 |
| 4,885,715 | 12/1989 | McCanny et al. | 364/728.01 |
| 4,893,255 | 1/1990 | Tomlinson, Jr. | 364/513 |
| 4,937,774 | 6/1990 | Malinowski | 364/724.12 |
| 4,967,340 | 10/1990 | Dawes | 364/200 |

FOREIGN PATENT DOCUMENTS 2180968 4/1987 United Kingdom .

OTHER PUBLICATIONS

Leibowitz, L-M, "Digital Correlator Speed Improvement by Multiplexing", Naval Research Lab, Wash. D.C., Sep. 30, 1983, 44 pages.
Kung, Hwand, "A Unified Systolic Architecture for Artificial Neural Networks", Journal of Parallel and Distributed Computing 6, (1989), pp. 358-387.
LSI Logic-product information brochure (3 pages) "L64240 Multi-bit Filter (MFIR)", Sep. 1989.
LSI Logic-product information brochure (2 pages) "L64210/L64211 variable-Length Video Shift Registers"; Oct. 1989.
Plessey Semiconductors-product information brochure (4 pages) "PDSP16488 Single Chip 2D Convolver With Integral Line Delays"; Sep. 1988.
INMOS-product information brochure (4 pages) "Image and Signal Processing Sub-System"; Jun. 1988.
Provence et al., "Systolic Arrays for Viterbi Processing in Communication Systems With a Time-Dispersive Channel"; IEEE Transactions on Communications, vol. 36, No. 10, Oct. 1988; pp. 1148-1156.
Kim et al., "On the Design of Fault-Tolerant Two-Dimensional Systolic Arrays for Yield Enhancement"; IEEE Transactions on Computers, vol. 38, No. 4, Apr. 1989, p. 516, left-hand column, Para. 5-right-hand column, Para. 1, FIGS. 1-3.
Kung & Hwang, "Parallel Architectures for Artificial Neural Nets" pp. II-165 thru II-172.
Hwang, Kung, et al., "A Universal Digital VLSI Design for Neural Networks", Dept. Electrical Engr., Princeton, pp. 1-8.

*Primary Examiner*—Michael R. Fleming
*Assistant Examiner*—Robert W. Downs
*Attorney, Agent, or Firm*—A. C. Smith

[57] ABSTRACT

A systolic array of processing elements is connected to receive weight inputs and multiplexed data inputs for operation in feedforward, partially— or fully-connected neural network mode or in cooperative, competitive neural network mode. Feature vector or two-dimensional image data is retrieved from external data memory and is transformed via input look-up table to input data for the systolic array that performs a convolution with kernal values as weight inputs. The convoluted image or neuron outputs from the systolic array are scaled and transformed via output look-up table for storage in the external data memory.

5 Claims, 16 Drawing Sheets

|  | COL 1 | COL 2 | ... | . | COL 512 |
|---|---|---|---|---|---|
| ROW 1 | $A_1$ | $A_{L+1}$ | ... | | |
| ROW 2 | $A_2$ | $A_{L+2}$ | ... | | |
| . | | | ... | | |
| . | | | ... | | |
| . | | | ... | | |
| ROW L | $A_L$ | $A_{2L}$ | ... | | $A_{512L}$ |
| ROW L+1 | $B_{L+1}$ / $A_{512L+1}$ | $B_{2L+1}$ / $A_{513L+1}$ | ... | | |
| ROW L+2 | $B_{L+2}$ / $A_{512L+2}$ | $B_{2L+2}$ / $A_{513L+2}$ | ... | | |
| . | | | ... | | |
| . | | | ... | | |
| . | | | ... | | |
| ROW 2L | $B_{2L}$ / $A_{513L}$ | $B_{3L}$ / $A_{514L}$ | ... | | $B_{513L}$ / $A_{1024L}$ |
| ROW 2L+1 | $B_{513L+1}$ / $A_{1024L+1}$ | $B_{514L+1}$ / $A_{1025L+1}$ | ... | | |
| ROW 2L+2 | $B_{513L+2}$ / $A_{1024L+2}$ | $B_{514L+2}$ / $A_{1025L+2}$ | ... | | |
| . | ≈ | ≈ | ≈ | ≈ ≈ | ≈ |
| . | | | ... | | |
| ROW 512 | | | ... | | $A_{262,144}$ ← $B_{262,144-511L}$ |

Figure 5B

IMAGE PIXEL ARRAY

```
p(1,1) p(1,2) p(1,3) p(1,4) p(1,5) . . .
p(2,1) p(2,2) p(2,3) p(2,4) p(2,5) . . .
p(3,1) p(3,2) p(3,3) p(3,4) p(3,5) . . .
p(4,1) p(4,2) p(4,3) p(4,4) p(4,5) . . .
p(5,1) p(5,2) p(5,3) p(5,4) p(5,5) . . .
p(6,1) p(6,2) p(6,3) p(6,4) p(6,5) . . .
p(7,1) p(7,2) p(7,3) p(7,4) p(7,5) . . .
p(8,1) p(8,2) p(8,3) p(8,4) p(8,5) . . .
p(9,1) p(9,2) p(9,3) p(9,4) p(9,5) . . .
  .      .      .      .      .
  .      .      .      .      .
  .      .      .      .      .
```

KERNEL ARRAY

```
k(1,1) k(1,2) k(1,3) k(1,4)
k(2,1) k(2,2) k(2,3) k(2,4)
k(3,1) k(3,2) k(3,3) k(3,4)
k(4,1) k(4,2) k(4,3) k(4,4)
```

SYSTOLIC PROCESSING ELEMENT ARRAY

FROM FIG. 5C

| Clock Cycle # | SRC1/ASA (32 bits) | A | B | PE(1,1) D1(1,1) | PE(1,1) D2(1,1) | PE(2,1) D1(2,1) | PE(2,1) D2(2,1) | PE(1,2) D1(1,2) | PE(1,2) D2(1,2) |
|---|---|---|---|---|---|---|---|---|---|
| 1 | p(1,1)p(2,1)p(3,1)p(4,1) | | | | | | | | |
| 2 | | p(1,1) | | | | | | | |
| 3 | p(5,1)p(6,1)p(7,1)p(8,1) | p(2,1) | p(5,1) | | | | | | |
| 4 | | p(3,1) | p(6,1) | | | | | | |
| 5 | p(1,2)p(2,2)p(3,2)p(4,2) | p(4,1) | p(7,1) | p(1,1) | | | | | |
| 6 | | p(1,2) | p(8,1) | p(2,1) | | | | | |
| 7 | p(5,2)p(6,2)p(7,2)p(8,2) | p(2,2) | p(5,2) | p(3,1) | | | | | |
| 8 | | p(3,2) | p(6,2) | p(4,1) | | | | | |
| 9 | p(1,3)p(2,3)p(3,3)p(4,3) | p(4,2) | p(7,2) | p(1,2) | p(5,1) | p(1,1) | | | |
| 10 | | p(1,3) | p(8,2) | p(2,2) | p(6,1) | p(2,1) | | | |
| 11 | p(5,3)p(6,3)p(7,3)p(8,3) | p(2,3) | p(5,3) | p(3,2) | p(7,1) | p(3,1) | x(1,1) | x(1,1) | p(1,1) |
| 12 | | p(3,3) | p(6,3) | p(4,2) | p(8,1) | p(4,1) | x(2,1) | x(2,1) | p(2,1) |
| 13 | p(1,4)p(2,4)p(3,4)p(4,4) | p(4,3) | p(7,3) | p(1,3) | p(5,2) | p(1,2) | x(3,1) | x(3,1) | p(3,1) |
| 14 | | p(1,4) | p(8,3) | p(2,3) | p(6,2) | p(2,2) | x(4,1) | x(4,1) | p(4,1) |
| 15 | p(5,4)p(6,4)p(7,4)p(8,4) | p(2,4) | p(5,4) | p(3,3) | p(7,2) | p(3,2) | x(1,2) | x(1,2) | p(1,2) |
| 16 | | p(3,4) | p(6,4) | p(4,3) | p(8,2) | p(4,2) | x(2,2) | x(2,2) | p(2,2) |
| 17 | p(1,5)p(2,5)p(3,5)p(4,5) | p(4,4) | p(7,4) | p(1,4) | p(5,3) | p(1,3) | x(3,2) | x(3,2) | p(3,2) |
| 18 | | p(1,5) | p(8,4) | p(2,4) | p(6,3) | p(2,3) | x(4,2) | x(4,2) | p(4,2) |
| 19 | p(5,5)p(6,5)p(7,5)p(8,5) | p(2,5) | p(5,5) | p(3,4) | p(7,3) | p(3,3) | x(1,3) | x(1,3) | p(1,3) |
| 20 | | p(3,5) | p(6,5) | p(4,4) | p(8,3) | p(4,3) | x(2,3) | x(2,3) | p(2,3) |
| 21 | p(1,6)p(2,6)p(3,6)p(4,6) | p(4,5) | p(7,5) | p(1,5) | p(5,4) | p(1,4) | x(3,3) | x(3,3) | p(3,3) |
| 22 | | p(1,6) | p(8,5) | p(2,5) | p(6,4) | p(2,4) | x(4,3) | x(4,3) | p(4,3) |
| 23 | p(5,6)p(6,6)p(7,6)p(8,6) | p(2,6) | p(5,6) | p(3,5) | p(7,4) | p(3,4) | x(1,4) | x(1,4) | p(1,4) |
| 24 | | p(3,6) | p(6,6) | p(4,5) | p(8,4) | p(4,4) | x(2,4) | x(2,4) | p(2,4) |

Figure 5D

|  | COL 1 | COL 2 | COL 3 | . | . | . | COL L |
|---|---|---|---|---|---|---|---|
| ROW 1 | 1 | L+1 | 2L+1 | . | . | . | $L^2-L$ |
| ROW 2 | 2 | L+2 | 2L+2 | | | | |
| ROW 3 | 3 | L+3 | 2L+3 | | | | |
| . | . | . | . | | | | |
| . | . | . | . | | | | |
| . | . | . | . | | | | |
| ROW L | L | 2L | 3L | | | | $L^2$ |

Figure 6A

| Clock Cycle # | 1 | 2 | 3 | ... | L | L+1 | L+2 | L+3 | ... | L²-1 | L² | L²+1 | L²+2 |
|---|---|---|---|---|---|---|---|---|---|---|---|---|---|
| CLOCK | | | | | | | | | | | | | |
| PE(1,1) | | | | | | | | | | | | | |
| D1 | p(1,1) | p(2,1) | p(3,1) | | p(L,1) | p(1,2) | p(2,2) | p(3,2) | | p(L-1,L) | p(L,L) | p(1,L+1) | p(2,L+1) |
| D2 | k*(1,1) | k(2,1) | k(3,1) | | k(L,1) | k(1,2) | k(2,2) | k(3,2) | | k(L-1,L) | k(L,L) | k*(1,1) | k(1,2) |
| PE(2,1) | | | | | | | | | | | | | |
| D1 | p(1,1) | p(2,1) | p(3,1) | | p(L,1) | p(L+1,1) | p(2,2) | p(3,2) | | p(L-1,L) | p(L,L) | p(L+1,L) | p(2,L+1) |
| D2 | — | k*(1,1) | k(2,1) | | k(L-1,1) | k(L,1) | k(1,2) | k(2,2) | | k(L-2,L) | k(L-1,L) | k(L,L) | k*(1,1) |
| PE(1,2) | | | | | | | | | | | | | |
| D1 | — | — | p(1,1) | | p(L-1,1) | p(L,1) | p(1,2) | p(2,2) | | p(L-2,L) | p(L-1,L) | p(L,L) | p(1,L+1) |
| D2 | — | — | — | | — | k*(1,1) | k(2,1) | k(2,1) | | k(L,L-3) | k(L,L-2) | k(L,L-1) | k(L,L) |

SYSTOLIC ARRAY IMAGE PROCESSING SYSTEM

FIELD OF THE INVENTION

This invention relates to a new architecture for a two-dimensional systolic array of processing elements that can efficiently calculate the two-dimensional convolution of a kernel of arbitrary size. The systolic array architecture is also efficiently organized to calculate the outputs of a two-layer neural network that includes fully- or partially-connected, feedforward processing elements. The systolic array architecture is also efficiently organized to calculate the outputs of a cooperative-competitive neural network.

BACKGROUND OF THE INVENTION

The algorithms of signal processing and image processing often treat data as a two-dimensional array of numbers. In image processing, the image itself is a two-dimensional array of values called pixels. In acoustic signal processing, a two-dimensional array of spectral coefficients distributed in time and frequency is often used. General purpose computers are usually too slow for real time processing of this type of data. The data rates are high, the processing required for many algorithms is extensive, and the throughput rate often requires a massively parallel approach to processing the data. Systolic arrays provide a solution to these obstacles in many cases.

A systolic array of processors has the capability of matching the data flow through the device to the algorithms used in image and signal processing. A systolic array is a network of processors that rhythmically compute and pass data through the network. Most systolic arrays are designed and built as a hardware implementation of a particular algorithm. In such cases the array can execute the algorithm for a problem of a specific size (or a limited number of sizes). For example, one commercially available convolution chip can be configured to Perform convolutions up to any kernel size, N×M, as long as N and M are both 8 or less. Another commercially-available chip can perform either a 3×7 convolution or a 1×21 convolution. If it is necessary to execute the same algorithm for a problem of a larger size, then a larger systolic array must be built. In neural network image processing, neural networks of different sizes and connectivity are often applied to an image during the process of transforming raw pixel data into feature vectors that serve to recognize and classify objects within the image.

SUMMARY OF THE INVENTION

In accordance with the present invention, convolutions can be performed of an arbitrary kernel size without building a new array or adding additional chips. This is particularly useful in neural network image processing for transforming raw pixel data into feature vectors for classifying and recognizing objects within the image. This is accomplished according to one embodiment of the present invention by each processing element of the systolic array computing the complete results of the convolution as both the kernel values and the pixel values propagate past the processing element.

DESCRIPTION OF THE DRAWINGS

FIGS. 5A and 5B are charts illustrating Port A and port B pixel scan and the clock cycle timing therefor according to the present invention;

FIG. 5C and 5D is a chart illustrating the timing of a 4×4 convolution with the contents of registers according to the present invention.

FIGS. 6A and 6B are charts illustrating a convolution kernel scan and clock cycle timing therefor according to the present invention;

DESCRIPTION OF THE INVENTION

Figure 1:
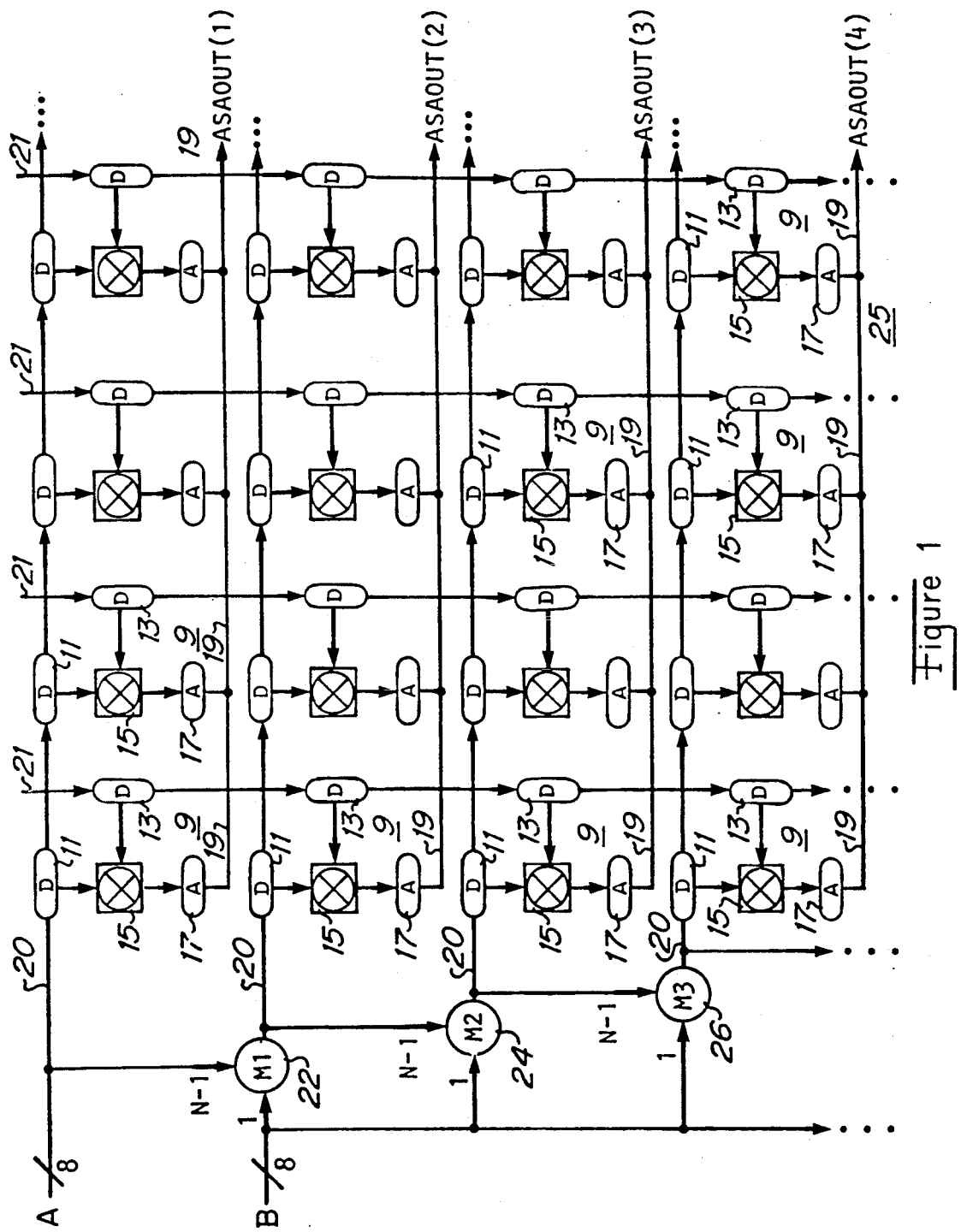
FIG. 1 is a block schematic diagram of one systolic array according to the present invention.
Figure 2:
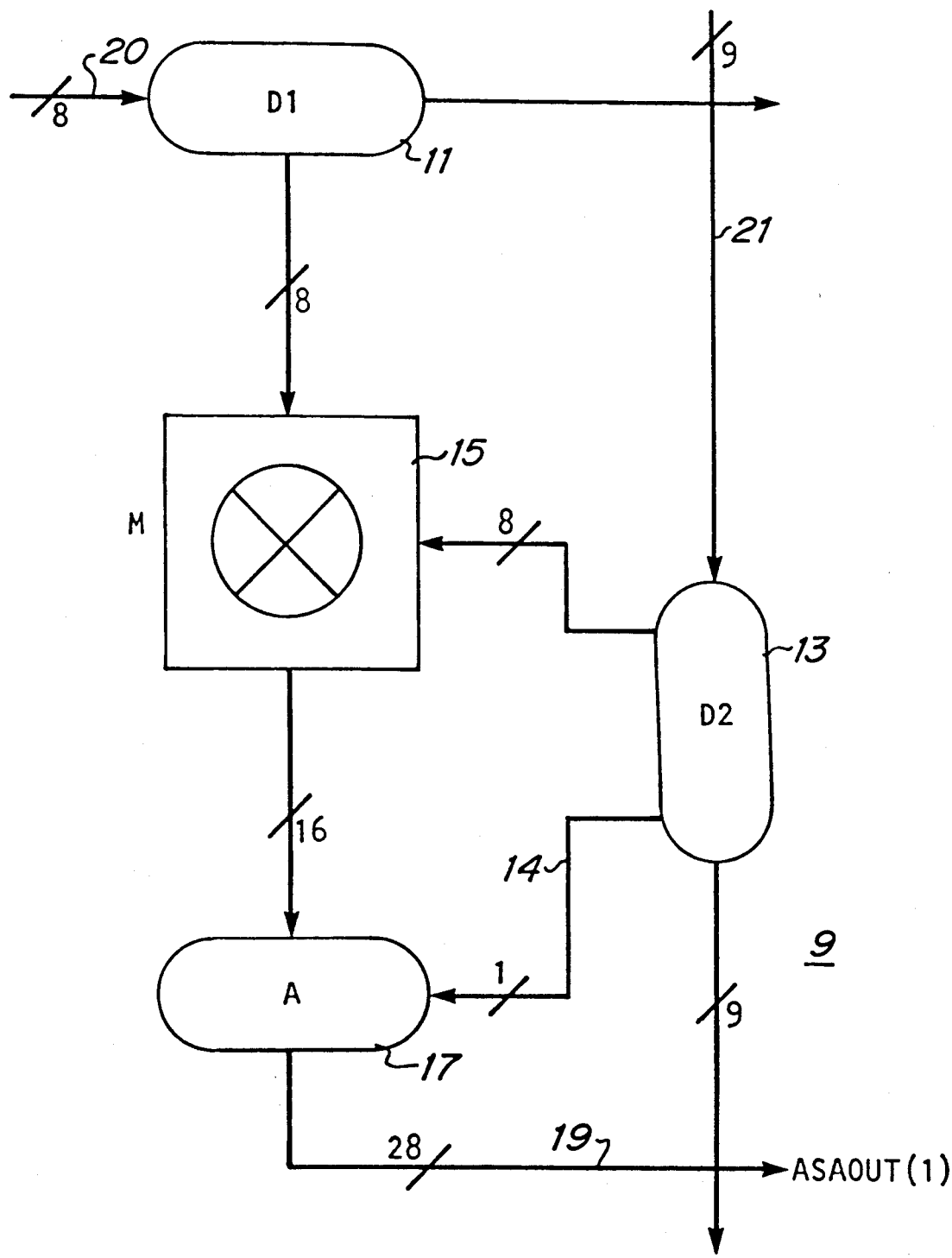
FIG. 2 is a block schematic diagram of a systolic array processing element within the embodiment illustrated in FIG. 1.

Referring first to FIG. 2, there is shown a block schematic diagram of a processing element 9 and including a data register 11, another data register 13, a multiplier 15, and an accumulator 17. For simplicity, clock lines for signals that synchronize the data transfer from element to element are not shown, but it should be understood that such clock lines and signals are included in an embodiment of the present invention, for example, as illustrated in FIG. 1. FIG. 1 illustrates a 4×4 systolic array of the processing elements 9 of FIG. 1; however, the array can be any size. Each processing element 9, as illustrated in FIG. 2, includes inputs 20 and 21, and output 19, and each such data path is shown with a specific number of bits. However, the number of bits in the illustrated embodiments is dependent on technology and cost considerations, and the illustrated numbers of bits represent typical numbers for an image processing application using state-of-the art VLSI technology. Of course, clock signals are also connected to be applied in a conventional manner to the data registers 11, 13, and to the multipliers and accumulators 15 and 17 throughout the array (not shown).

For a typical image processing convolution application, each processing element 9 performs the following on each clock cycle: 8-bit pixel data flows into a register 11 from the register of a previous element; an 8-bit kernel weight value flows into register 13 from the register 13 in a previous element; the values in the registers 11 and 13 are multiplied in the multiplier 15, and the 16-bit result of the multiplier is accumulated in the accumulator 17. The kernel size of the convolution determines when the accumulator register value is placed onto the 28-pin output bus 19. A ninth control bit 14 is added to the data path 21 for the kernel weights to synchronize the beginning and end of the kernel. The control bit is used to place the value of the accumulator on the 28-bit ASAOUT(I) bus 19 and to restart the next accumulation.

The ability of this systolic array to compute a two-dimensional convolution of arbitrary kernel window size with a fixed number of processing elements 9 in a N×N array is due to the structure of each element and to the manner in which the data 20 and weights 21 flow into the array from external memory. The weights 21 are illustrated in FIG. 1 as arriving at the boundary of the systolic array on N independent data paths 21. The data 20 is illustrated as arriving on two independent paths A and B, and then being multiplexed into the array on N paths 20. Typical chip circuitry 44 to accomplish this task are shown in FIG. 3.

Figure 3:
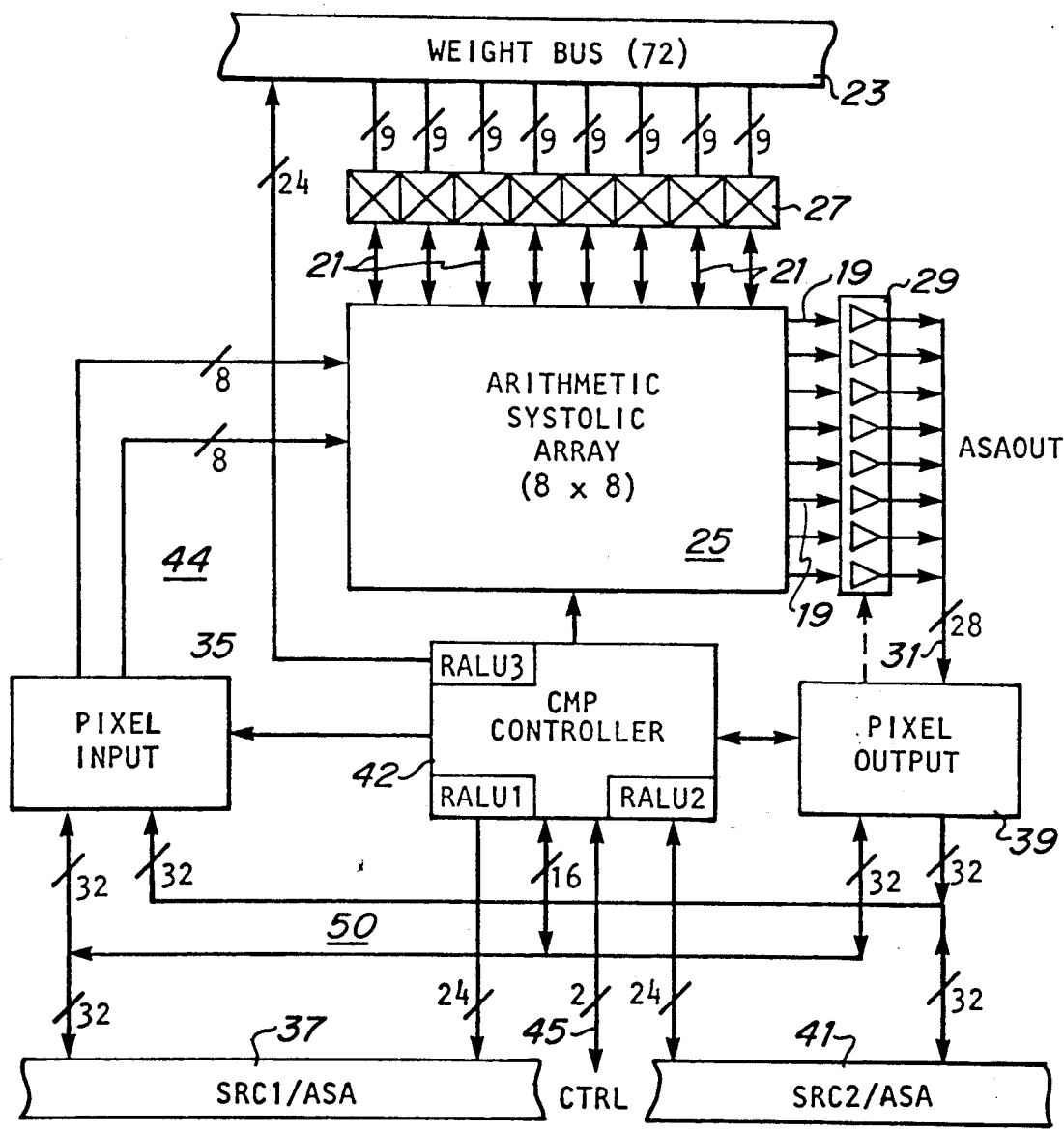
FIG. 3 is a pictorial diagram of circuit arrangements on an integrated circuit chip in accordance with the present inventions.
Figure 4A:
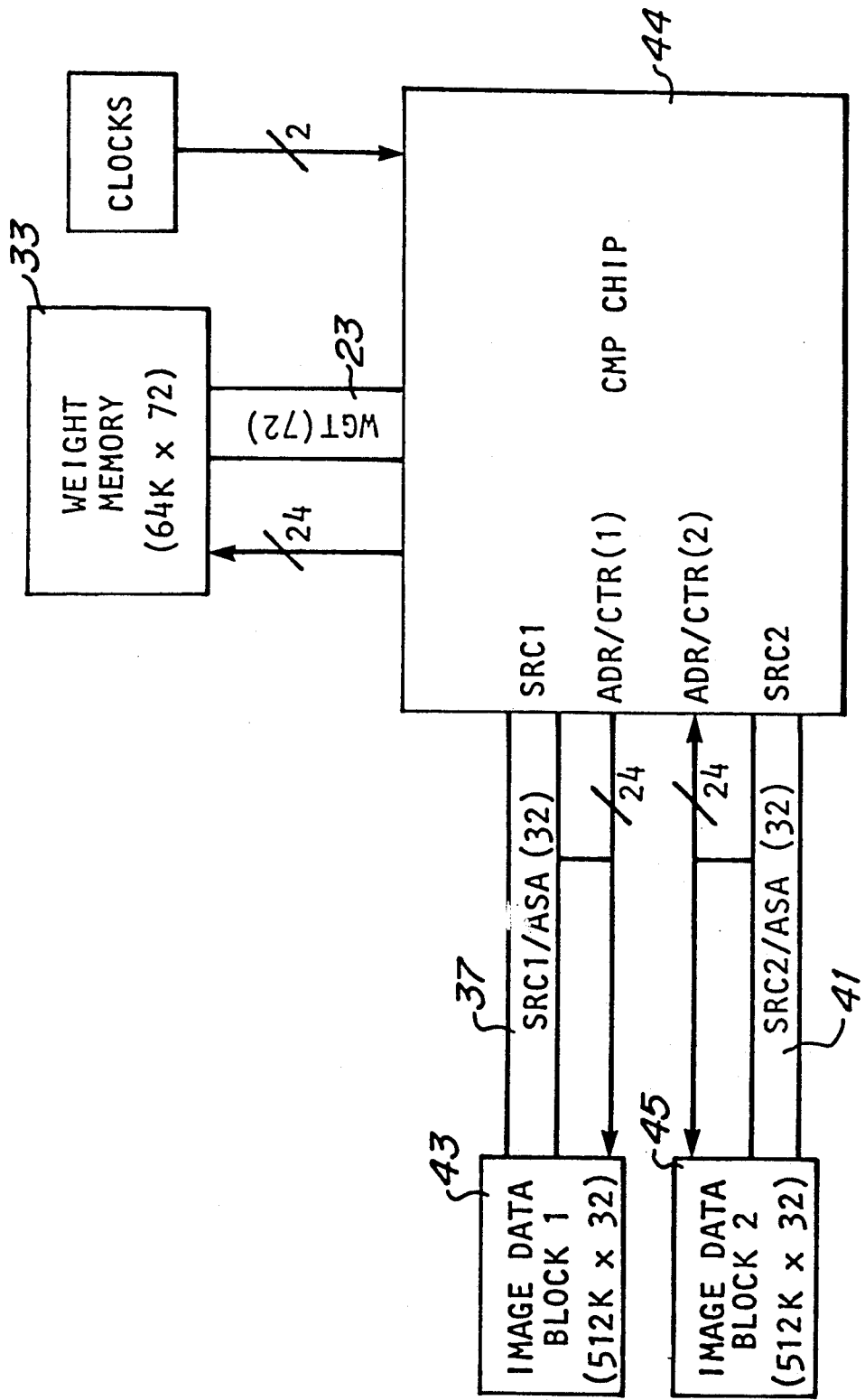
FIGS. 4A and 4B are block schematic diagrams of external memory interfaces and the internal CMP chip controller for operation according to the present invention.
Figure 4B:
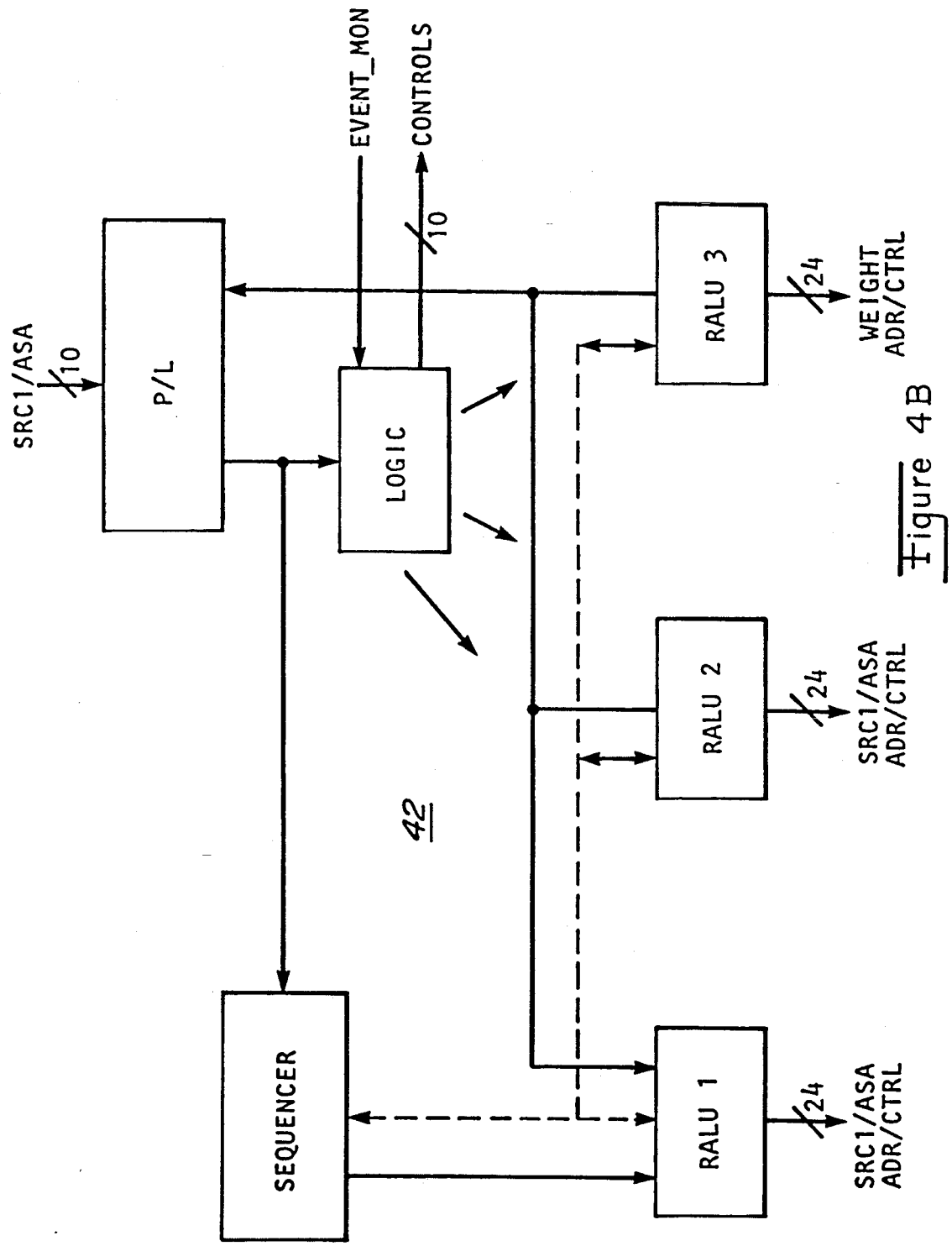
Figure 8:
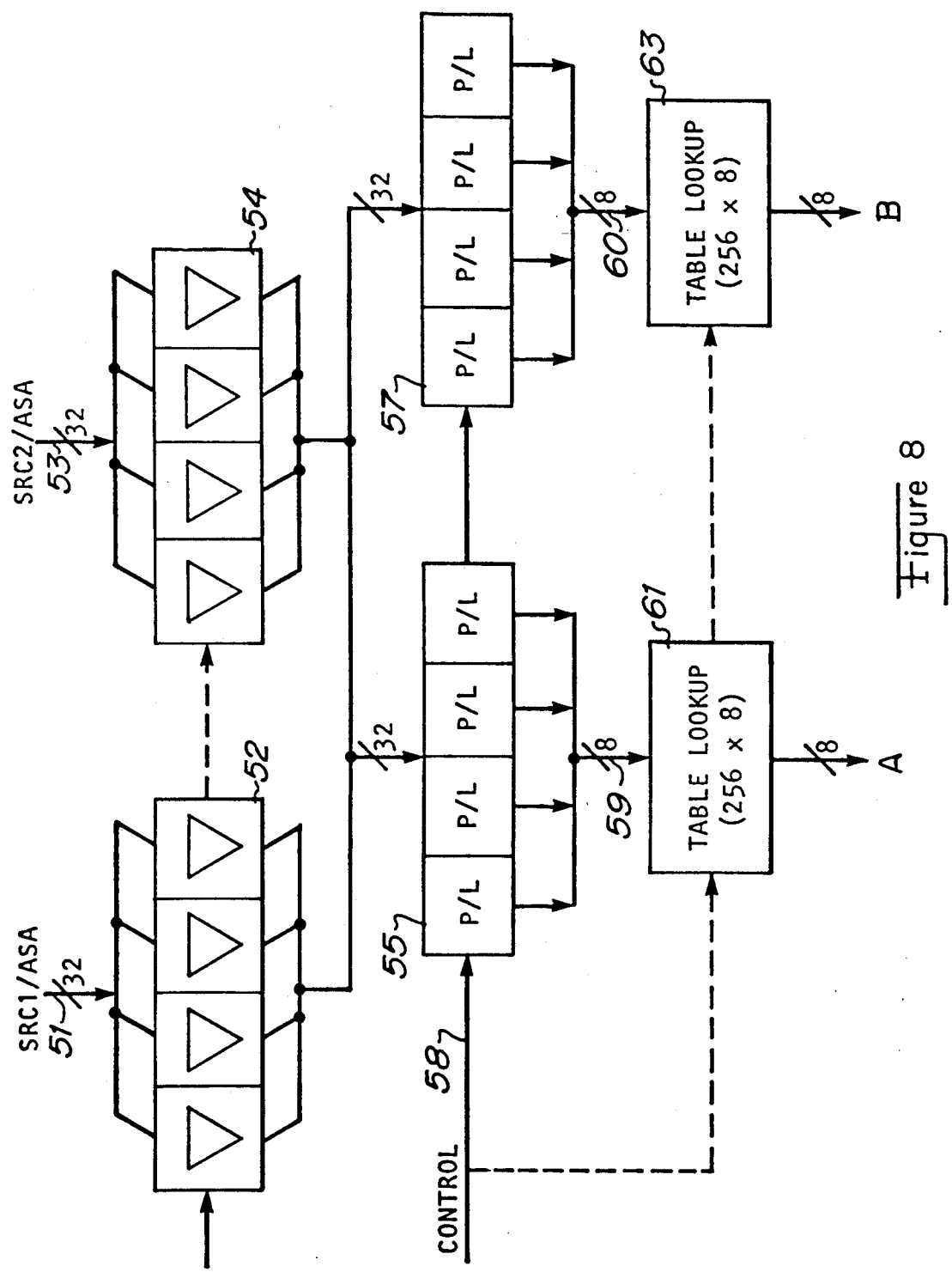
FIG. 8 is a block schematic diagram of the pixel output circuitry according to one embodiment of the present invention.
Figure 9:
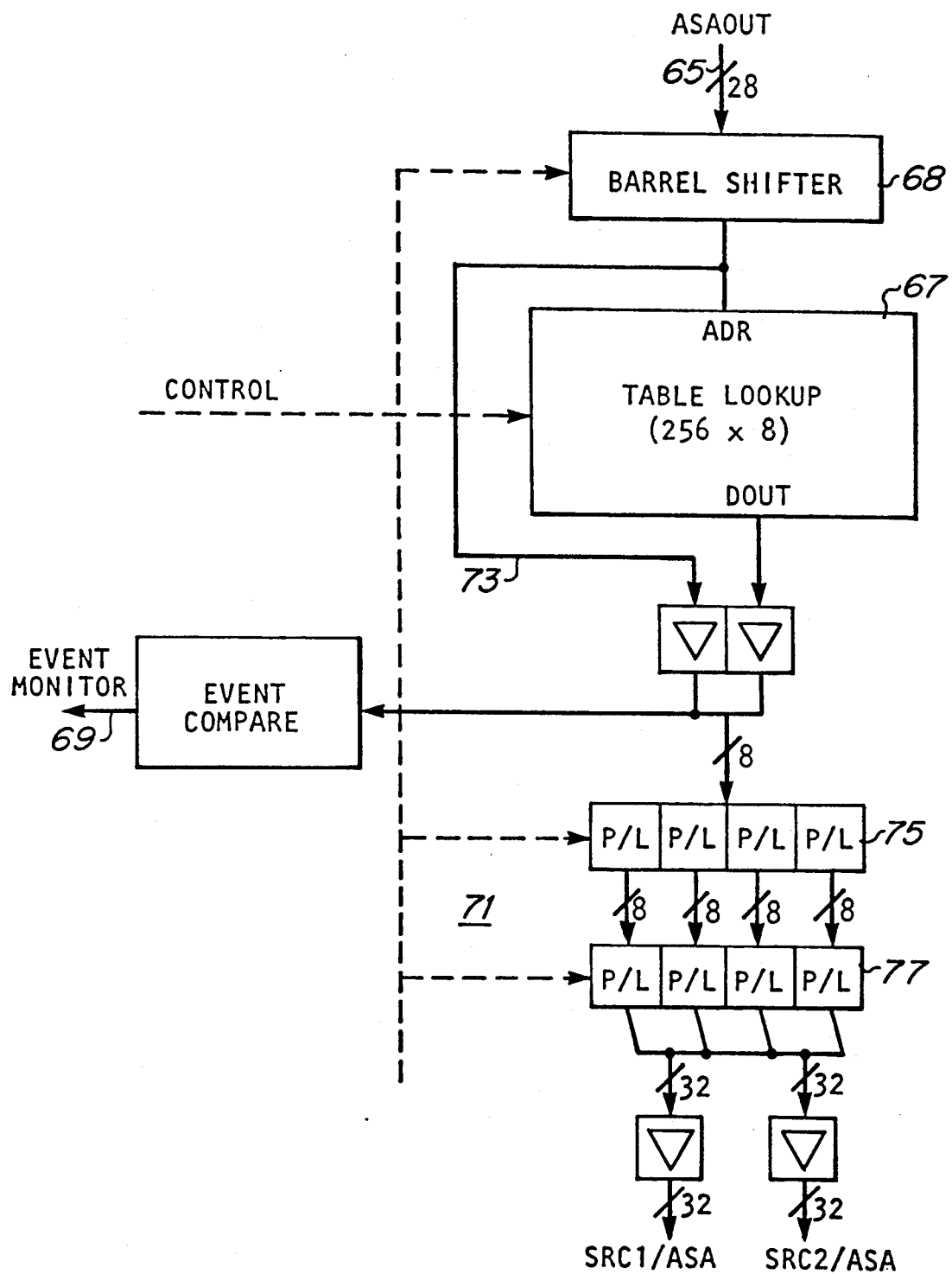
FIG. 9 is a block schematic diagram of a pixel input circuit according to one embodiment of the present invention.

With reference to the block schematic diagram of FIG. 3, there is shown an 8×8 systolic array including processing elements 9 of FIG. 2 arranged in a systolic array that is similar to the circuitry illustrated in FIG. 1, and that is extended (on the right) by an additional four independent weight inputs 21 and (at the bottom) by four additional data inputs 20. The weight bus 23 of weight inputs is connected to the systolic array 25 via individual drivers 27 that provide bi-directional signal transfers between the weight bus 23 and the array 25. The bi-directionality of the drivers 27 permit the weights to be stored in the general purpose image data block memory 43 and 45 as illustrated in FIG. 4. The weights for a specific kernel may then be loaded from the image data block as required for the desired convolution or neural network operation of the invention. Also, the output buses 19 of the array are connected via individual amplifiers 29 to the common output 31, and the inputs A and B are successively multiplexed 22, 24, 26 for application to the array as data inputs 20 in the manner illustrated in FIG. 1. The weight bus 23 is connected to external memory 33, as illustrated in FIG. 4, and the pixel inputs A and B are connected via pixel input circuitry 35, as illustrated in FIG. 9 (described later herein), to the input bus 37, 41 while the output bus 31 is connected via pixel output circuitry 39, as illustrated in FIG. 8 (described later herein), to the output bus 37, 41. These connections to the buses 37 and 41 are interchangeable 50 to enhance throughput by facilitating the interchangeable connections to separate banks of memory 43 and 45 as illustrated in FIG. 4A. The chip controller 42, as illustrated in FIG. 4A, is a hierarchical control scheme which is loosely coupled 45 with an external control microprocessor (not shown). The external microprocessor executes the less structured portions (e.g. configuration of pixel memory) of an algorithm in conventional manner.

The bandwidth requirement of the pixel memory is reduced through interleaving by increasing the bus width to 32-bits. This also reduces the addressing bandwidth required by the external microprocessor. In similar fashion, the hierarchical control that is used allows the external microprocessor to execute higher level control commands, allowing the controller 42 embedded in the chip 44 to execute the lower level, cycle by cycle control.

Example control commands from the external microprocessor indicate which post-processing functions are required, initialize table lookups, and specify calls to the image-based library functions that reside in memory for the chip controller 42. This hierarchy of instructions allows new user-developed algorithms to be tailored to the chip through high-order languages, requiring only additional library routines to be developed as needed.

In order to simplify the chip controller, control of the arithmetic systolic array 25 is not cell-dependent, that is, individual cell control signals are not required as they are developed from the data flow. For example, the control signal that indicates that we have finished a weighted-sum or convolution window is encoded as a ninth bit of the kernel memory and systolically passes from cell-to-cell at the correct time.

In addition, control flags from the chip 44 are provided to the external microprocessor to indicate high priority events for which a quick response, low latency, is needed. An example of this is the zero-detection algorithm that is implemented by the post-processing output interface block of the chip.

Figure 5A:
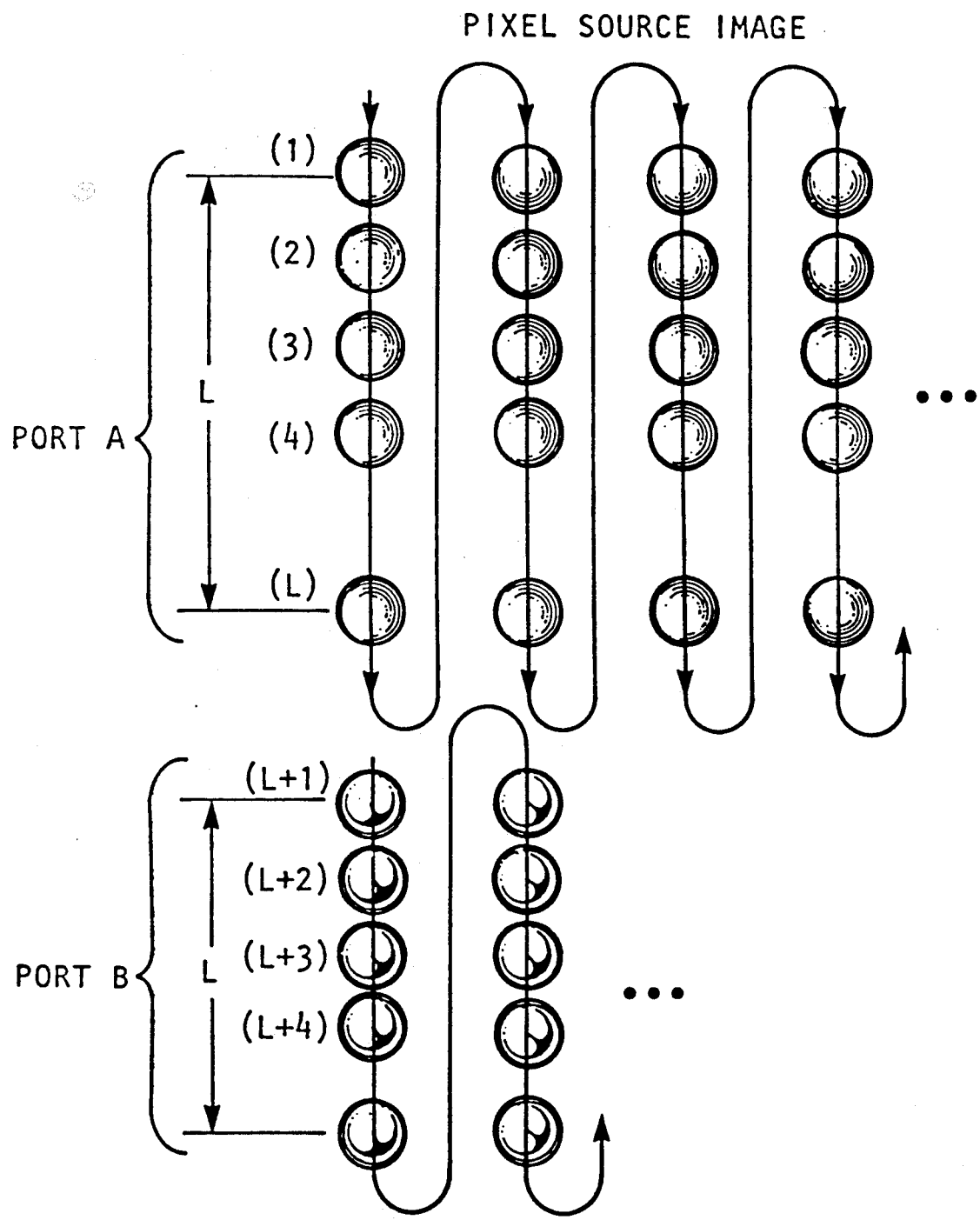

In operation, for example, on an optically-scanned image as a source of input data, the systolic array 25 requires that the source image data be scanned vertically in a lexical manner, as illustrated in FIGS. 5A and 5B. Each row of processing elements 9 has its own unique source inputs. For example, let the image be of size 512×512 pixels, represented by an array of pixel values p(i,j); the systolic array be of size 8×8; and the kernel be of size L×L, where L is larger than 8. port A scans the first L rows beginning at row 1 in the manner shown, and port B (delayed by L cycles) scans the L rows beginning at row L+1. After scanning the first L rows, port A continues scanning the next L rows at row L+1. After the L cycle delay, port B begins scanning at row 2L+1 port B continues its scan similarily, L rows at a time. FIG. 5B illustrates the scan pattern of the image for input ports A and B for an L×L convolution on a 512×512 image. The subscripts on A and B represent the clock cycle on which the image pixel value is retrieved from memory and placed on the respective port. There are a total of 512×512 =262,144 clock cycles in a complete scan. FIG. 5C illustrates the contents of the registers as a function of clock cycle number for a 4×4 convolution. All of the registers shown are 8 bits except the SRC1/ASA register which is 32 bits. Only the first 24 clock cycles are illustrated, however, the pattern remains the same. Every 4 clock cycles, the multiplexer M1 22 samples the B input and places the results in the D1 register 11 of $\overline{\phantom{a}}\overline{\phantom{a}}(2,1)$. It should be noted that on clock cycles 22 and 23 the first convolution calculations are complete for PE(1,1) and PE(2,1), respectively. Results are transferred to the ASAOUT(1) and ASAOUT(2) busses 19, respectively, as the initial kernal value K(1,1) arrives at the processing element.

The scan of an L×L kernel is illustrated in FIGS. 6A and 6B. Let the array of kernel values be k(i,j) where i is the row number and j is the column number. The values k(i,j) flow down the vertical paths 21 of FIG. 1 in the numerical order illustrated in FIG. 6A. This FIGURE illustrates a scan pattern of an L×L convolution kernel. The number represents the clock cycle on which the kernel value is retrieved from memory.

Let the processing elements be denoted by a similar notation to the pixels. PE(i,j) represents the (i,j)$^{th}$ processing element, where i is the row and j is the column. PE(1,1) completes the computation of the (1,1)$^{th}$ convolution output after $L^2$ cycles. FIG. 6B is a timing diagram that illustrates the relationship between the kernel values, the pixel values, and the processing elements in the systolic array timing diagram, pixel array values and kernel array values are shown in each of the D1 and D2 registers as a function of clock cycle numbers for PE(1,1), PE(2,1), and PE(1,2). The weight k(1,1)* carries the ninth control bit 14 that places the accumulator 17 register value on the output bus 19, and zeros the accumulator. That output value is the accumulated sum of products and equals the convolution output value. The (−) symbol implies "don't care" values. Note that the kernel values k(i,j) in D2 of PE(2,1) are simply delayed by one clock cycle as we move from D2 of processing element PE(1,1) to D2 of PE(2,1) in the vertical direction. The pixel values in D1 of PE(1,1) and PE(2,1) are identical except at cycle L+1 when the pixel value from port B is switched into register D1 of PE(2,1). A pixel value from port B is switched into register D1 of PE(2,1) every L cycles thereafter.

Also note that as we move in the horizontal direction from processing element PE(1,1) to PE(2,1), the pixel values are simply delayed by one clock cycle. The commencement of the flow of the kernel values is delayed by L+1 clock cycles for each column at the top of the systolic array. Each accumulator does not begin to produce valid results until the first kernel value k(1,1) arrives. PE(1,2) completes the computation of the output O(1,2) L+2 cycles later. The convolution weights are similarly delayed for the third and each subsequent PE in the top row.

Figure 7:
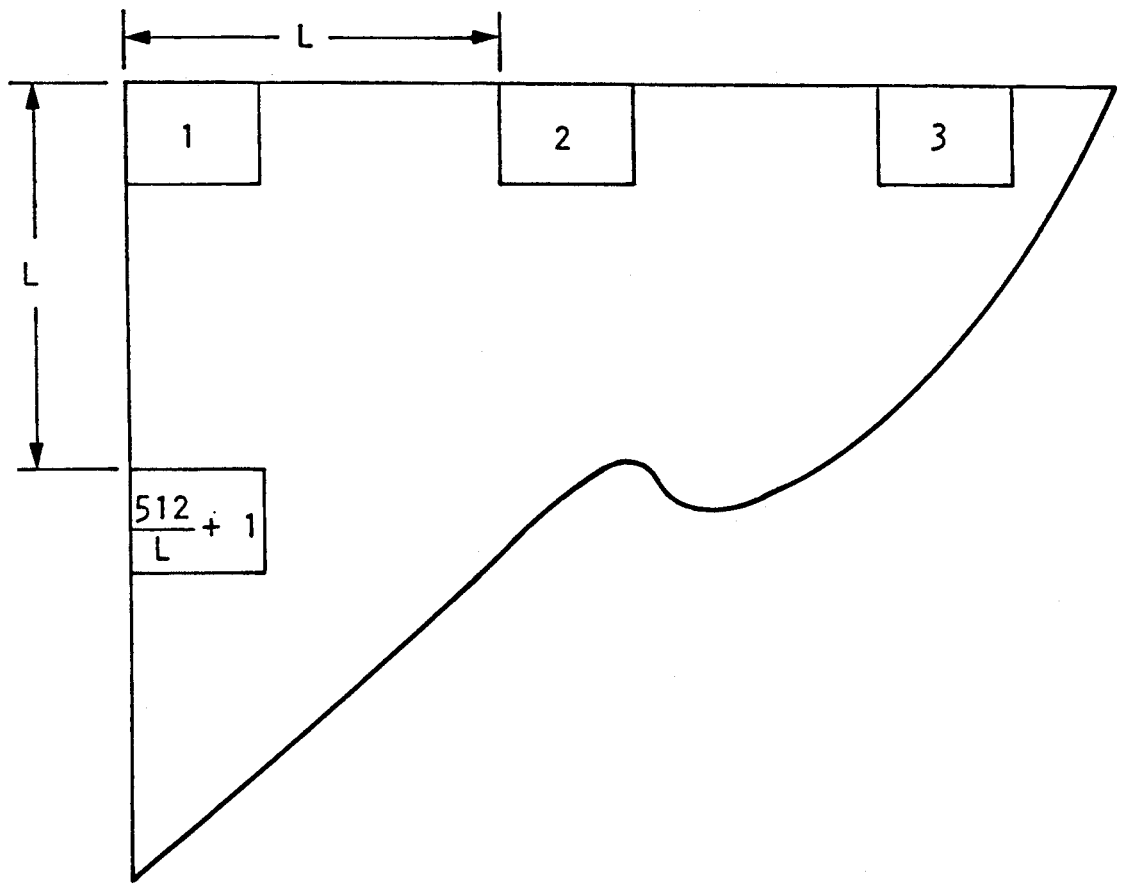
FIG. 7 is a chart illustrating the output sequence pattern according to the present invention.

In the second row, PE(2,1) gets its first L−1 pixels from the A data path from multiplexers 22, as illustrated in FIG. 1. After L−1 clock cycles, PE(2,1) needs the first pixel of the B data scan. This pixel is provided by the multiplexer 22. In a similar manner, the multiplexer 24 provides the correct data to enter the third row and so on down to the eighth row of the 8×8 systolic array of processing elements. In one complete scan through the image, the systolic array completes a pattern of 8×8 blocks of L×L convolution outputs, as illustrated in FIG. 7. If L is greater than 8, it is necessary to rescan the array several times to fill in the blocks of coefficients not computed on previous scans. The number of required re-scans, K, is given by the formula:

$$K = \frac{L^2}{N^2}$$

where N=8, the number of processing elements in each row and column in the illustrated embodiment. The systolic array 25 is thus able to compute a two-dimensional convolution (for example, of an optical image) of arbitrary size, limited only by the size of the external weight memory 33 that stores the kernel values, as illustrated in FIG. 4A.

Feedforward, Fully-Connected Neural Network Mode

In a feedforward, fully-connected neural network, such as encountered in backpropagation, each processing element 9 has an independent set of weights 21 that it uses to process the input data 20. For this mode, the data will flow in port A in FIG. 3, and the weights will enter the eight independent channels from the weight bus as illustrated in FIG. 3. Only the top row of the systolic array is active in the fully-connected neural network mode. Each systolic array cell represents a neuron that performs the dot product of a set of weights with the input data. This case is distinguished from the convolution mode in which the weights flowing into each column of the systolic array were delayed versions of the same set of weights. Each processing element in the top row of the systolic array represents a single neuron in a fully connected layer of a feedforward neural network. The systolic array can efficiently compute the outputs of eight of the N neurons in the layer of the neural network in parallel. If N is greater than eight, then the input data and weights must pass through the systolic array for each set of eight neurons. Each processing element, PE(l,i) for $1 \leq i \leq 8$, computes the following output O(l,i):

$$O(l,i) = \sum_{j=1}^{M} W_{ij} X_j \quad 1 \leq i \leq 8$$

where the $W_{ij}$ flow down the vertical paths 21 and $X_j$ flow across the first row path 20. M is the number of input neurons in the previous layer of the simulated neural network.

Cooperative Competitive Neural Network Mode

A cooperative, competitive neural network is characterized by a process in which neurons on the same plane interact with one another. The most common form of competition is the on-center off-surround interaction, as follows. Let the outputs of a feedforward neural network that has operated on an image plane of N×N pixels be expressed as f(i,j). These output values can be thought of as transformation of the pixel image into a new image. Each output pixel f(i,j) interacts with its surrounding neighbors in competition by comparing its value to all the surrounding values in order to reach a conclusion as to which pixels have relatively large values. Those that have small values are repressed and those which have large values are enhanced. Several known specific neural networks such as Grossberg's Boundary Contour System (BCS), Masking Fields, and Kohonen Learning have effectively applied competitive image processing functions.

One of the keys to competition is computing the average of the pixels over the neighborhood. For illustration, consider a 3×3 region in which the center pixel is the on-center pixel and the other eight surrounding pixels are the off-surround. A 3×3 matrix illustrates this interaction symbolically as:

$$\begin{bmatrix} s & s & s \\ s & c & s \\ s & s & s \end{bmatrix}$$

where C denotes center and S denotes surround.

Each pixel labelled as a surround pixel in the above matrix is itself a center pixel with its own on-center off-surround interaction in the larger image. The algorithm requires us to produce a moving average and compare each pixel to that average. The moving average can be done by a convolution with a kernel that has equal values in all of its cells. Thus, a second output plane of pixels, g(i,j) is produced that contains local average values by a convolution process with a weight matrix:

$$W_{i,j} = \frac{1}{8} \begin{bmatrix} 1 & 1 & 1 \\ 1 & 0 & 1 \\ 1 & 1 & 1 \end{bmatrix}$$

The competition is done by then comparing the value f(i,j) to the value g(i,j) by means of subtraction. The competition algorithm requires that if the on-center pixel has a value that is greater than a factor $\alpha$ times the average value, then it should be enhanced. The comparison and the multiplication of the average value by $\alpha$ can all be done in the convolution kernel by using a kernel of the form:

$$W_{i,j} = \frac{1}{8} \begin{bmatrix} -\alpha & -\alpha & -\alpha \\ -\alpha & +8 & -\alpha \\ -\alpha & -\alpha & -\alpha \end{bmatrix}$$

where $\alpha$ is typically of the order of 1.3. The result is then passed through a non-linear thresholding function such as the logistic sigmoid. A new pixel plane is thus built with the outputs. The same on-center off-surround process is repeated with the new pixel plane. This is a neural network relaxation process that selects and enhances the largest local pixel values and is able to emphasize feature vectors.

The invention is able to implement this interaction by means of an iterative relaxation technique that makes use of repeated convolutions of the data passed through the systolic array, together with the pre- and post-processing table look-up functions that can implement the thresholding function, as illustrated in FIGS. 8 and 9.

Referring now to FIG. 8, there is shown the pixel input block diagram which operates with the pixels organized in RAM into 32-bit words so that 4 pixels can be read out or stored in one memory cycle. This organization allows the pixel throughput rate to more easily match the on-chip speed of the systolic array portion of the CMP chip. Separate interfaces 51, 53 from two sources are illustrated, each capable of being multiplexed 52, 54 into latches 55, 57 for the separate Ports A and B. There is an input table look-up function as the data 59, 60 enters the table. Each pixel is transformed by a 256×8 RAM 61, 63. The RAM table may be loaded by means of control lines 58. The result is latched and then read out sequentially. The contents of the table look-up function depend on the specific neural network or transformation implemented. If the neural network was simulating a retina (in a manner similar to the analog chips that Carver Mead has produced which are described in the article by Carver Mead and M. A. Mahowald entitled "A Slilcon Model of Early Visual Processing", published in *Neural Networks*, vol. 1, pp. 91-97 (1988), then the function could be a logarithm.

Referring now to FIG. 9, there is shown the pixel output block diagram including several functional units such as the arithmetic systolic array 65 hierarchical bus unit, the data transformation unit 67, an event monitor 69, and the output unit 71. In FIG. 9, the ASAOUT 65 receives the results from the arithmetic array processor at a peak of one per cycle and an average rate that depends on the size of each neural network layer or convolution window, but is no greater than half the input rate. As the window size of the feedforward network increases above eight, the output bandwidth becomes a small percentage of the input bandwidth. This reduced bandwidth requirement could allow the chip to multiplex its output ports with the input ports to save I/O pins and simplify pixel memory.

With reference to FIG. 3, ASAOUT 31 receives inputs from each ASA cell through a hierarchical bus structure under control of the chip controller 42. As each processing element completes a result, it is enabled and read through a dual bus structure in a single cycle. This hierarchical bus allows up to 64 processing elements in the systolic array 25 to bus together, reducing 'real estate' requirements on integrated circuit chips by avoiding wide 28-bit registers for each accumulator. Eight additional tri-state buffers 29 are required to provide this two-level bus multiplexing.

The data transformation unit contains a barrel shifter 68 to normalize the data. The results can accumulate up to a maximum of 28-bits depending on window size, and are normalized by a barrel shifter that can shift anywhere from 0-12 bits in a single cycle.

This feeds a RAM based 256×8 table lookup (TLU) 67 to perform a sigmoid function, for example. The normalized data drives the TLU's address, giving the final result. The TLU can be loaded by the chip controller from external memory (not shown). The capability is also provided to bypass 73 the TLU in the event the transformation is unity.

An event monitor 69 is provided to monitor events at the output of the TLU. When a programmed event is detected, the event monitor signals the chip controller than an event is detected. The chip controller then interacts with an external processor through control lines to indicate that an event occurred.

The output interface 71 to the pixel bus is similar to the pixel input interface. The TLU drives four double-buffered 8-bit registers 75, 77. Double-buffering is required to allow for overlapping the pixel memory write operation with the TLU store.

In a cooperative-competitive neural network mode, the systolic array performs a convolution with a connection window where the on-center weight is positive and the off-surround weights are negative. The table look-up functions perform the non-linear thresholding function required for the competitive interaction. A completely general, cooperative, competitive interaction can be performed in this manner with the cooperative connections having positive weights and the competitive connections having negative weights.

The advantages of the systolic array according to the present invention include the ability to compute convolutions of arbitrary size in the systolic array, limited only by the size of the external memory and the size of the accumulator bus 19 in FIG. 2. The 28-bit ASAOUT bus given in the image processing example with 8-bit by 8-bit multipliers 15 limits the kernel size to 64×64. These numbers are merely dependent on the present technology used to implement the invention. Another advantage is that no large delay lines are required for the data or the weights, as are required in prior systolic array architectures used for convolution. Further, the systolic array is very efficient for convolutions of arbitrary kernel size. It can process the complete two-dimensional array of data in one pass for kernel sizes less than the size of the processing element array. For kernel sizes, L×L, that are larger than the systolic array size, N×N, the number of passes through the data is given by:

$$K = \frac{L^2}{N^2}$$

This value, K, is the smallest number possible in any systolic array with a limited number of multipliers 15.

This is based on the total number of multiply-accumulate cycles required to do $M^2$ convolutions for an array of $M \times M$ data points. The number of cycles required (neglecting edge effects) is given by:

$$T = L^2 M^2$$

If all the $N^2$ multipliers are working at 100% efficiency, then the number of cycles per multiplier is:

$$\frac{T}{N^2} = \frac{L^2 M^2}{N^2}$$

This number is the minimum time, in cycles, that the array can perform the convolution. If a single data point is read per array cycle, then $M^2$ is the number of cycles for a complete pass of the image through the systolic array. Thus the ratio of the minimum time required to the number of cycles per pass is given by:

$$K = \frac{T}{M^2 N^2} = \frac{L^2}{N^2}$$

in accordance with the present invention as an optimum systolic architecture. In addition, the outputs of a fully-connected, feedforward neural network, such as back-propagation, can be computed by this systolic array with no change in architecture. Furthermore, the outputs of a cooperative-competitive layer of a neural network can be computed by this systolic array with no change in architecture.

The present systolic array requires that two data values be read for each clock cycle. The required access time for the external memory can be reduced by reading the data in words of 32 bits that represent 4 data values of 8 bits each. In this manner, a fast VLSI systolic array can interface to relatively slow memory and external hardware.

In another embodiment of the present invention, a variable-length delay line can be connected to the A input of FIG. 1 to provide the data required for the B input. This would eliminate the requirement to read the external memory twice for each systolic array cycle. The delay line could be implemented on the chip, and the length of the delay line is a product of the number of columns of the image and the number of rows of the kernel.

In another embodiment of the present invention, a set of variable length recirculating delay lines could be used to store the weights instead of the external weight memory shown in FIG. 4. These delay lines are small (size L for a kernel of size $L \times L$) and could be implemented on the chip to eliminate the need for an external weight interface. However, this same configuration would inhibit being able to efficiently implement a fully-connected, feedforward neural network in that the size of the fully-connected neural network would then be limited by the length of the delay lines, and the speed would be limited by the rate at which the weight values could be modified or injected into the delay lines.

Figure 10:
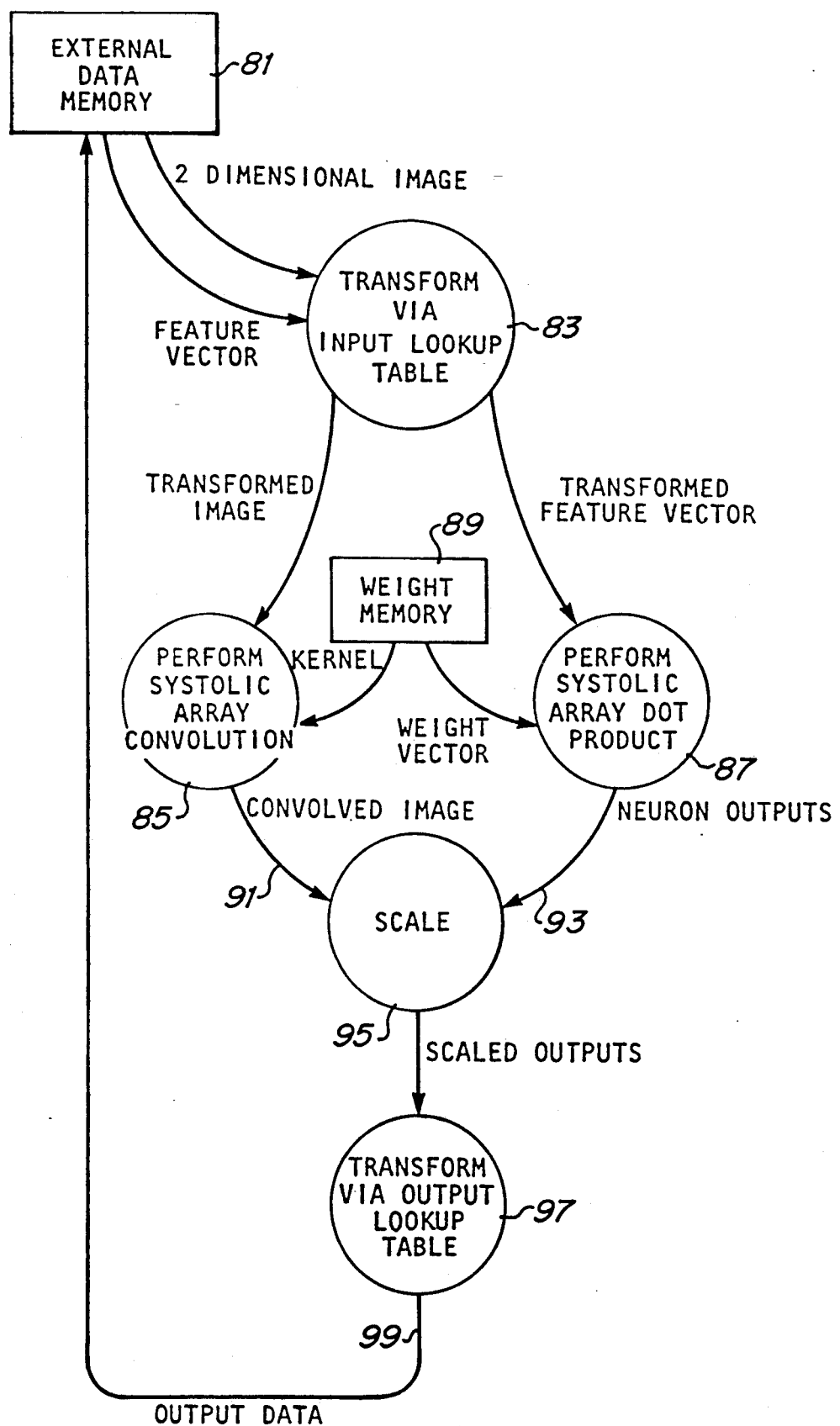
FIG. 10 is a flow chart illustrating data flow in operation according to the present invention.

FIG. 10 is a high-level data flow diagram that illustrates the operation of the present invention. Both convolution and feedforward neural network operations are illustrated. Control signals and flow are not shown, only the data as it flows between major portions of the system.

Either a two-dimensional image or a feature vector flows from external data memory 81 to the look-up table process 83. There, data is transformed by the function stored in the table and flows out to the systolic array 85, 87. The systolic array is configured either to perform a convolution 85 on the transformed image with a kernel that is stored in the weight memory, or to perform a series of dot products 87 on weight vectors stored in the external weight memory 89. After passing through the systolic array, the convoluted image 91 or the neuron outputs 93 are scaled 95, then transformed, by the output table lookup 97. The outputs 99 of the look-up table are then stored in external memory 81.

Two distinct flow paths 81, 83, 85, 95, 97 and 81, 83, 87, 95, 97 are shown for two modes (convolutional mode and fully-connected neural network mode) of the systolic array. The cooperative-competitive neural network mode was not illustrated in the data flow diagram because it operates in a manner identical to the convolutional mode as it pertains to the chip. The data, however, in the cooperative-competitive mode, is re-circulated in a relaxation process that was explained in the previous section. The external re-circulation is under the control of an external microprocessor or host computer.

Figure 11:
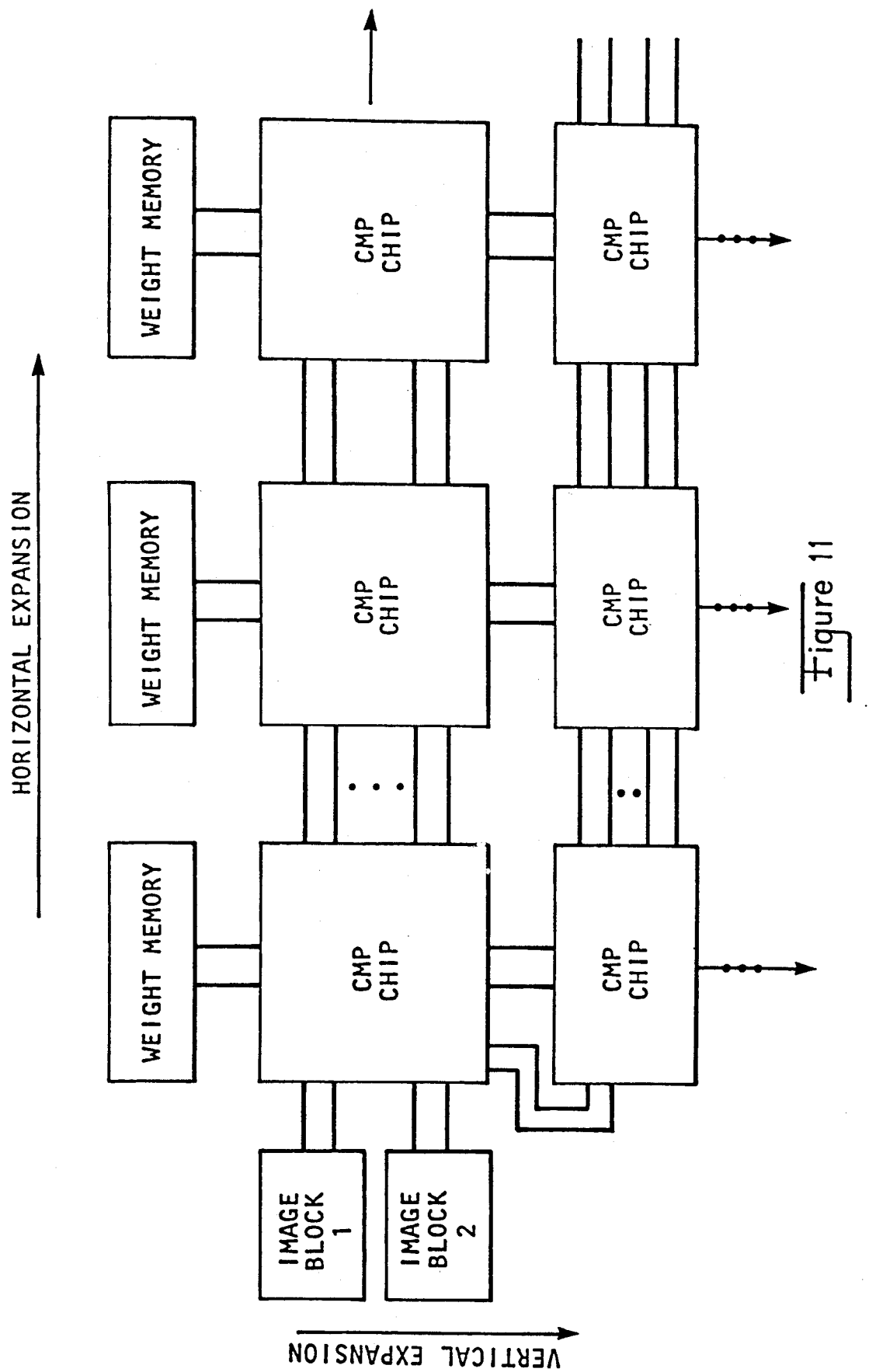
FIG. 11 is a block schematic diagram illustrating an expanded network of additional chips and additional weight memories.

The systolic array has been configured to be incrementally expandable by providing the capability of utilizing additional array chips in both horizontal and vertical directions. The block schematic diagram of FIG. 11 depicts one form of expansion by the use of six additional CMP chips and two additional weight memories.

Expanding horizontally provides for the simultaneous calculation of additional pixel convolutions while also providing the added feature of tripling the number of interconnects per second for fully connected feed-forward neural networks. This effectively triples the performance of the system for a given image frame size. Expanding horizontally requires the additional of external weight buffers to feed data in data bus 21. Additional input signals would be added to allow for the passing of data bus 19 to be transmitted to the next horizontal CMP chip's bus 20, bypassing the input multiplexers.

Expanding vertically provides a two-fold convolutional performance increase with no additional fully connected feed-forward performance increase. There is no need for additional weight buffers for the vertical expansion. For this first CMP node column, the B bus and the final M3 multiplexer output would be passed to the next vertically positioned CMP node, eliminating the need for additional pixel memory blocks.

The modular characteristics of the systolic array according to the present invention greatly facilitates tailoring the architecture of the array to the particular application.

What is claimed is:

1. A systolic system for performing a two-dimensional image processing convolution of pixel data with kernel data, the system comprising:

a systolic array of processing elements, wherein each of said processing elements comprises a pixel data register, a kernel data register, a multiplier coupled to said pixel data register and said kernel data register for multiplying the contents of said registers, and an accumulator coupled to said multiplier for adding the results of said multiplication to the previous contents of the accumulator;

wherein said pixel data registers are coupled in a plurality of rows, each row comprising an equal number of pixel data registers coupled in series such that a pixel data element entered into the input end register of said row is transmitted sequentially through the other registers of said row to the output end register of said row; and wherein said kernel data registers are coupled in a plurality of columns, each column comprising an equal number of kernel data registers coupled in series such that a kernel data element entered into the input end register of said column is transmitted sequentially through the other registers of said column to the output end register of said column;

wherein there are N rows and N columns;

output bus means comprising a plurality of members, each member of said plurality being coupled to the accumulators in the processing elements having pixel data registers in one of said rows and receiving the contents of said accumulators, said plurality being equal in number to the number of said rows;

kernel input means comprising a plurality of members, each member of said plurality being coupled to the input end register of one column of kernel data registers and supplying kernel data to said input end register, said plurality being equal in number to the number of said columns;

a first input for supplying pixel data;

a second input for supplying pixel data; and multiplexer means coupled to said first input and said second input and to the input and registers of said rows of pixel data registers for transmitting pixel data from said first input and said second input to the input end registers of said rows;

wherein said multiplexer means includes a plurality of multiplexers, each supplying pixel data to one of said rows and having an input coupled to said second input and having another input coupled to receive pixel data from another row; and said multiplexer means operates in sample intervals to apply data input to said another row from said second input each one sample interval out of N sample intervals, and from the data input from another row each N−1 sample intervals out of N sample intervals.

2. The systolic system according to claim 1 wherein each of said multiplexers is coupled to supply data inputs to other of said plurality of rows.

3. The systolic system according to claim 1 wherein the kernel input means in each column is successively delayed for application to each processing element having a kernel data register in such column.

4. The systolic system according to claim 3 wherein said kernel input means for a column includes a control signal; and said accumulators for the processing elements having kernel data registers in a column are coupled to respond to a control signal in the kernel input means for transferring the accumulator contents to the output bus means member for the associated row in response to said control signal.

5. The systolic system according to claim 1 comprising:

memory means for storing and retrieving a two-dimensional array of data samples; and means for supplying the data samples in a selected sequence to the first input of the systolic system at discrete time intervals, and for supplying the same data samples in a separate selected sequence substantially simultaneously to the second input of the systolic system.

* * * * *

UNITED STATES PATENT AND TRADEMARK OFFICE
CERTIFICATE OF CORRECTION

PATENT NO. : 5,138,695

DATED : August 11, 1992

INVENTOR(S) : Robert W. Means and Horace J. Sklar

It is certified that error appears in the above-identified patent and that said Letters Patent is hereby corrected as shown below:

Col. 11, line 31, "and" (second occurrence) should be --end--

Signed and Sealed this

Fifth Day of October, 1993

Attest:

BRUCE LEHMAN

Attesting Officer

Commissioner of Patents and Trademarks